United States Patent [19]

Neroda et al.

[11] 4,315,343
[45] Feb. 16, 1982

[54] DOUBLE INSULATED VACUUM MOTOR ASSEMBLY

[75] Inventors: Thomas H. Neroda; Roger E. Hollis, both of Watertown, N.Y.

[73] Assignee: The Scott & Fetzer Co., Watertown, N.Y.

[21] Appl. No.: 130,984

[22] Filed: Mar. 17, 1980

[51] Int. Cl.³ .............................................. A47L 9/28
[52] U.S. Cl. .................................... 15/339; 15/353; 15/412; 310/43; 310/89
[58] Field of Search ................. 15/321, 339, 353, 412; 310/43, 50, 89; 417/373

[56] References Cited

U.S. PATENT DOCUMENTS

| | | | |
|---|---|---|---|
| 3,685,843 | 8/1972 | Jacyno | 310/50 X |
| 3,875,436 | 4/1975 | MacFarland | 310/50 X |
| 4,142,270 | 3/1979 | Nauta | 15/353 |
| 4,227,279 | 10/1980 | Tribolet | 15/321 |

Primary Examiner—Chris K. Moore
Attorney, Agent, or Firm—Pearne, Gordon, Sessions, McCoy & Granger

[57] ABSTRACT

A double insulated vacuum motor assembly for use in wet/dry utility cleaners. Strategic elements of the motor assembly are shielded by or formed of electrically insulating material to prevent hazardous electrical current between the fan chamber and the motor and migration of fluids into the motor. A unique fan mounting arrangement permits a conventional motor shaft construction and use of a metal fan while preventing the possibility of electrification of the fan. Mounting arrangements and an insulating shroud for the vacuum motor and the fan chamber prevent migration of pressurized fluids into the motor.

8 Claims, 3 Drawing Figures

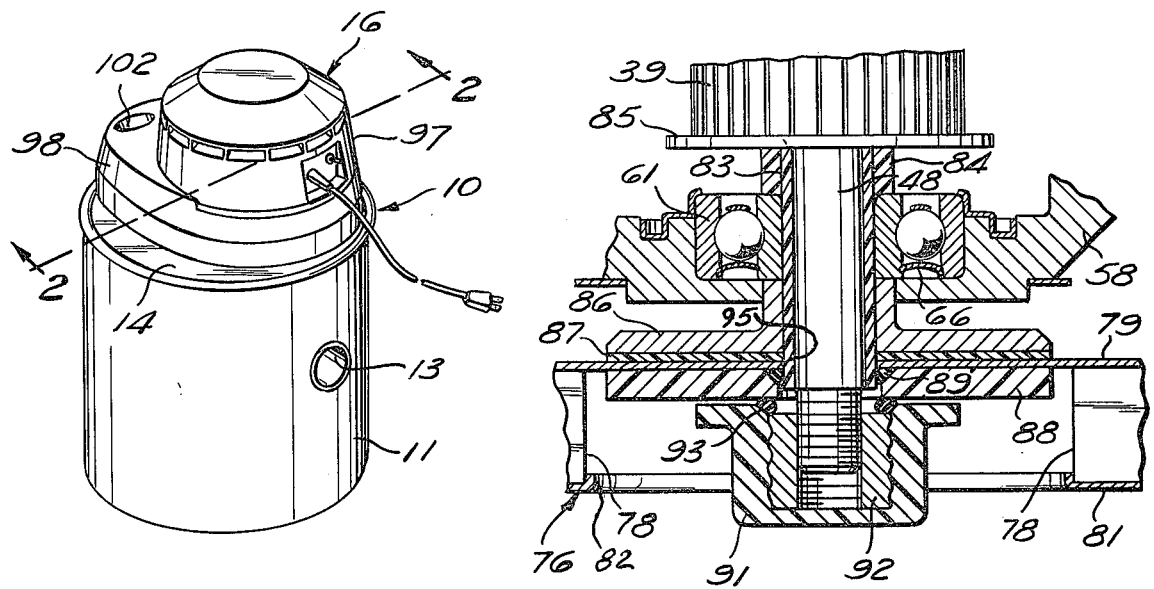
Fig. 1
Fig. 3
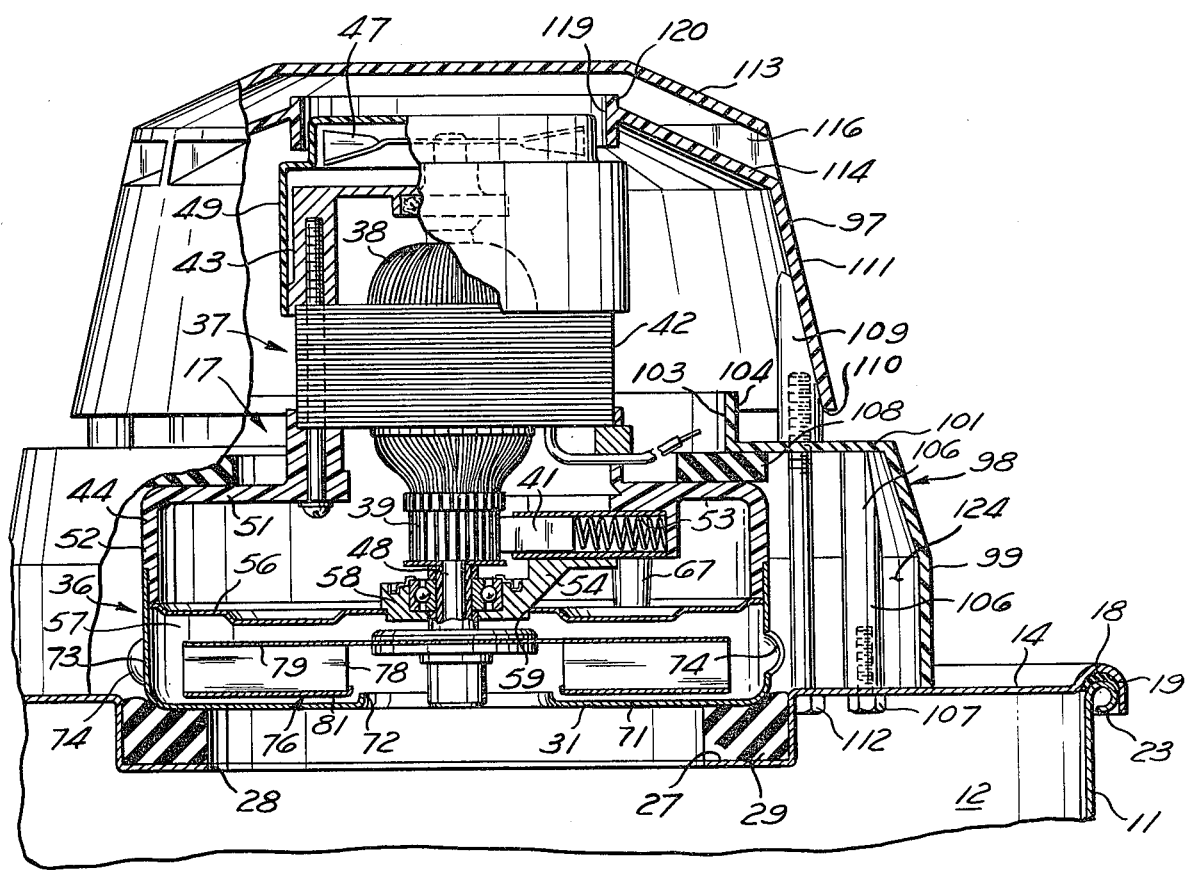
Fig. 2

DOUBLE INSULATED VACUUM MOTOR ASSEMBLY

BACKGROUND OF THE INVENTION

The invention relates to vacuum cleaners and, in particular, to a vacuum motor unit for wet/dry machines.

Vacuum cleaner assemblies capable of picking up liquids such as water present a hazard of electrical shock where such liquids are drawn into contact with electrically conducting parts of the vacuum motor unit. These parts may be electrically energized as the result of an internal short within the motor. Likewise, a hazard may result where an electrically conducting fluid migrates into the motor section of the vacuum unit. In recognition of these or similar dangers to a user, many hand tools and like appliances have in recent years been designed with double insulation so that, as the term implies, two distinct electrically insulating barriers are provided between normally electrified motor elements.

Generally, double insulation techniques have not been applied to vacuum cleaner devices. One double insulated vacuum cleaner motor unit is disclosed in U.S. Pat. No. 3,875,436 to MacFarland. The machine disclosed in this patent, however, is not directly applicable to conventional tank or shop type designs as is the present invention.

SUMMARY OF THE INVENTION

The invention relates to a double insulated vacuum motor assembly particularly suited for wet/dry service, in which parts of the motor subjected to contact by vacuumed fluids are uniquely electrically insulated. The vacuum motor unit includes a fan chamber and centrifugal fan each constructed of sheet metal for purposes of durability and performance. The fan is mounted on an end portion of a motor shaft which extends into the fan chamber. Elements utilized to mount the fan to the motor shaft serve the additional function of electrically shielding the shaft from contact with vacuum-collected fluids. The disclosed fan mounting and shaft shielding arrangement comprises a series of elements adapted to be assembled on a motor shaft of generally conventional construction. This add-on arrangement of insulating elements avoids special shaft designs or insulation techniques, such as, for example, where the shaft is encased in electrical insulation along the length of the rotor.

The fan chamber and motor are separated by a wall through which the motor shaft end extends. At this wall, provisions are made for sealing fluids against leakage paths along the shaft or an associated bearing. As disclosed, the metal fan housing is assembled on a motor bell housing formed of a suitable electrically insulating rigid plastic material. The fan chamber and motor bell housing are enveloped by a shroud also of electrically insulating rigid plastic material. The disclosed shroud serves a multiplicity of functions which include retention of the vacuum motor unit in its assembled position on a tank cover, double insulation of parts of the motor, and formation of a manifold with the tank cover for conducting fluids expelled from the fan chamber to a convenient outlet. In the preferred embodiment, the motor bell housing and fan chamber are held in their desired position by axial clamping forces developed by the shroud when the latter is secured to the cover. A compressible gasket is interposed between a radial face of the motor bell housing and the shroud to prevent migration of fluids within the shroud to other parts of the motor.

Various other features and advantages of the invention will become apparent from the following description of but one embodiment of the invention.

BRIEF DESCRIPTION OF THE DRAWING

FIG. 1 is a schematic, perspective view of a utility vacuum cleaner embodying the invention;

FIG. 2 is a cross-sectional view of a vacuum motor assembly of the utility vacuum cleaner; and FIG. 3 is a cross-sectional view on an enlarged scale of details of the mounting of a vacuum fan to the shaft of the vacuum motor.

DESCRIPTION OF THE PREFERRED EMBODIMENT

Referring now to the drawing, there is shown a utility type vacuum cleaner assembly 10. The cleaner assembly 10 is of the wet/dry type and, as will be explained, is electrically insulated to reduce the hazard of electrical shock in operation when vacuum-collecting liquids such as water. The cleaner assembly 10 includes a vertically disposed cylindrical tank base 11. Material is collected in an interior 12 of the tank 11 in a known manner through an inlet 13 provided on the side of the tank. A cover 14 disposed on an upper end of the tank 11 is removable therefrom for purposes of periodically discharging collected materials from the tank interior 12. An electrically insulating rigid plastic shroud 16 carried on an upper side of the cover 14 encloses a vacuum motor assembly 17 (FIG. 2).

Typically, the tank or drum 11 is fabricated in the manner of a steel pail of five-gallon or like capacity. The inlet 13 is an annular fitting, ideally of molded plastic, secured to a hole cut into the side of the tank 11 for communication with the tank interior 12. The inlet 13 is formed with a circular bore adapted to couple by a friction fit with the end of a conventional flexible pickup hose. The cover 14 is a generally circular plate conveniently stamped from steel sheet stock. An elastomeric gasket 18 is adhesively affixed in a peripheral groove 19 at the underside of the cover 14 to form a relatively airtight seal with an upper rolled edge 23 of the tank 11.

An annular recess or dishlike area 27 surrounds a central aperture 28 in the cover 14. An annular body or ring 29 of elastomeric, compressible material, preferably a closed cell foam material, is dimensioned to fit snugly within the recess 27 without significantly obstructing the aperture 28. A lower radially extending face 31 of the vacuum motor assembly is seated on and gasketed by the elastomeric ring 29.

The vacuum motor assembly 17 is comprised of a fan unit 36 coaxially arranged with a motor unit 37. The motor unit 37 is preferably of the universal electric type and is of generally conventional construction. The motor unit 37 includes an armature 38, commutator 39, electrical brushes 41 and stator 42. The stator 42 includes a stack of laminations held between motor end bells 43 and 44. The end bell 43 is preferably formed of zinc or other metal for purposes of conducting heat away from an armature shaft bearing mounted therein. The end bell, as well as a cooling fan 47 on an upper end of an armature shaft 48, are shielded by an electrically insulating cap 49 of suitable rigid plastic material snapped over the end bell 43. Ideally, the other end bell or housing 44 is molded of electrically insulating rigid plastic material. The bell-like configuration of the motor housing 44 includes a radially extending wall 51 and an axially extending, peripherally continuous skirt 52. The cavities 53 (only one is shown in FIG. 2) for electrical brushes 41 are molded into generally radially extending webs 54 integrally connected with the radial housing wall 51. The motor housing or lower end bell 44 serves multiple functions, including the convenient support of the brushes 41 and accomplishing of a substantial transition in motor diameter between the relatively small diameter adjacent the stator 42 and a relatively larger diameter adjacent the fan unit 36 which, in the illustrated example, is in a ratio of approximately one to two.

A circular sheet metal baffle wall 56 physically isolates the interior of the motor unit 37 from a chamber 57 of the fan unit 36. A bearing holder 58 which is an integral part of the motor housing 44 supports the baffle wall 56 through an associated central hole 59. The bearing holder 58 supports a lower bearing 61 for the armature shaft 48. A suitable adhesivelike, waterproof sealant is applied between a peripheral area of contact between the outer perimeter of baffle wall 56 and motor housing skirt 52, as well as a peripheral area of contact between the baffle wall and the bearing holder 58. As indicated in FIG. 3, the lower bearing 61 is of the antifriction type and includes at least one seal 66. The heads of screws (not shown) securing the baffle plate 56 to the bell housing 44 are threaded into circumferentially spaced bosses typified at 67 and integral with the housing and have their heads sealed with a suitable waterproof sealant at points where they pass through the baffle wall. The chamber 57 of the fan unit is enclosed by a cup-shaped sheet metal cover 71 fabricated with an aperture 72 which forms an inlet to the chamber. An axially extending, cylindrical, peripheral wall 73 of the cover 71 is louvered to provide a multiplicity of outlets 74 for the chamber 57.

A fan 76 mounted on the shaft 48 of the armature 38 centrifugally drives air entering the fan housing inlet 72 radially outwardly through the louvers 74. The fan 76 is fabricated of sheet metal components and includes a plurality of radially extending, circumferentially spaced blades 78 axially interposed between a pair of discs 79, 81. A disc 81 adjacent the fan cover 71 is provided with a central aperture 82 for admitting fluid from the inlet 72 to the area of the blades 78.

With particular reference to FIG. 3, details of the mounting arrangement of the fan assembly 76 on the armature shaft 48 are shown. The illustrated fan mounting arrangement is effective to electrically insulate the fan assembly 76 from the shaft 48 for safety purposes. An electrically insulating tube of suitable plastic or like material 83 is slipped over the end of the armature shaft 48 extending from the commutator 39. The fan disc 79 is provided with a central hole 95 which fits closely over the insulating tube 83 to avoid direct contact with the armature shaft 48, which normally is fabricated of steel and is therefore electrically conductive. The insulating tube or sleeve 83 is dimensioned to be pressed into the inner race of the bearing 61 with sufficient interference to provide a fluidtight fit therebetween. The outer race of the bearing 61 preferably is similarly pressed into its associated bore in the bearing holder 58 with sufficient interference and/or use of a waterproof sealant to provide a fluidtight fit therebetween. It will be understood that the shaft 48 need not be covered by the sleeve 83 beyond the bearing 61 so that the shaft can be readily affixed to the armature 38 by a heavy press fit therein or other conventional economical means. Prior to assembly of the armature shaft 48 and insulating sleeve 83 into the bearing 61, a tubular spacer 84 and a washer 85 are assembled on the shaft and sleeve elements. With the outboard end of the armature shaft 48 and electrically insulating tube 83 extending through the bearing 61, a series of elements, including the fan disc 79, are assembled on the shaft. Innermost is a fan spacer 86 having an axially extending hub and a radially extending web. Abutting the web of the fan spacer 86 is a gasket washer 87. The fan disc 79 abuts the gasket washer 87 and in turn is abutted by a relatively thick washer of plastic or other suitable rigid insulating material. The bore of the washer 88 is beveled at its side facing the fan disc 79 to provide an annular recess for a sealing O-ring 89. An electrically insulating plastic nut 91 with a threaded metal insert 92 is assembled on complementary threads formed on the lower free end of the armature shaft 48. An O-ring seal 93 is disposed in a beveled recess associated with the plastic nut 91. Water and other fluids are sealed from contact with the end of the armature shaft 48 by the O-rings 89, 93 and the gasket 87 upon tightening of the nut 91 and consequent axial compression of these O-rings and gasket. From inspection of FIG. 3 and the above discussion, it will be understood that water or other fluids in the fan chamber 57 cannot contact the armature shaft 48 or pass into the motor housing 44 via a path along the armature shaft.

The motor and fan units 37, 36 are shielded by the electrically insulating shroud 16 formed of separable upper and lower sections 97, 98. The lower section 98 molded of a suitable rigid plastic is generally oblong in plan view and includes a depending skirt 99 adapted to rest on the cover 14. An upper face 101 of the lower shroud section 98 is formed with a circular outlet 102 adjacent the smaller of its ends and a circular motor clearance hole 103 adjacent the larger of its ends. The clearance hole 103 is stiffened by an axially extending peripheral flange 104.

A plurality of integrally formed bosses 106 (only one is shown in FIG. 2) depend from the face 101 of the lower shroud section to the plane of the lower edge of the skirt 99. Screws 107 are assembled through holes in the cover 14 and are threaded into the lower ends of these bosses 106 to secure the lower shroud section 98 to the cover. An annular compressible gasket 108, preferably formed of a closed cell foam material, is disposed between the motor housing 44 and the portion of the lower shroud section face 101 surrounding the clearance hole 103. The axial length of the shroud skirt 99 and bosses 106 with respect to the total effective length of the motor bell housing 44 and fan cover 71 is dimensioned to assure that the annular gasket 108 and ring 29 are adequately compressed when the skirt and bosses abut the cover 14.

The upper shroud section 97, like the lower section 98, is formed of a rigid plastic, electrically insulating material. The upper section 97 has the general configuration of an inverted cup. A plurality of circumferentially spaced bosses 109 integrally molded with a side wall 111 of the section 97 depend a limited distance from a lower edge 110 of such side wall to space the latter from the lower section face 101. Elongated screws 112 extend through both the cover 14 and the lower shroud section face 101 and are threaded into the bosses 109 to secure the shroud sections together.

The end face of the upper shroud section 97 has double walls 113, 114 which, for molding purposes, may be formed separately and later permanently joined in any suitable manner. Integrally formed with the inner one 114 of the double walls are a plurality of circumferentially spaced, radially extending ribs or vanes 116 which serve to space the walls 113 and 114 apart. The motor cooling fan 47 and associated cap 49 are nested within a flanged aperture 119 formed in the center of the inner wall 114. Air for cooling the motor unit 37 circulates through the upper shroud section 97 by passing between the double walls 113 and 114, through the motor, and through the gap between the lower edge 110 of the upper shroud section 97 and the lower shroud section 98.

The electrically insulating shroud 16 provides a double insulating function for the motor unit 37. It is to be noted that the flange 104 is sufficiently higher than the lower edge 110 of the upper shroud 97 to prevent line-of-sight penetration to the motor by objects introduced through the gap between this edge and the face 101 of the lower section 98. Similarly, a flange 120 associated with the aperture 119 in cooperation with the inner wall 114 prevents line-of-sight penetration between the double walls 113, 114 to the motor.

Axial clamping forces developed in the foam rings or gaskets 29, 108 are sufficient to locate and fix the motor and fan units 37, 36 in their desired position. A collarlike exhaust chamber or manifold 124 is defined between the interior of the lower shroud section 98, the cylindrical surfaces of the motor housing 44 and fan chamber 57, and associated portions of the cover 14. Fluids exhausting from the outlet louvers 74 travel through this chamber 124 and out of the outlet 102. The upper foam ring 108 forms a fluidtight seal between the radial surface of the motor housing 44 and shroud section 98 surrounding the clearance hole 103. As a result, fluids in the exhaust chamber 124 are precluded from entering electrically energized armature and stator areas of the motor unit 37.

Although the preferred embodiment of this invention has been shown and described, it should be understood that various modifications and rearrangements of the parts may be resorted to without departing from the scope of the invention as disclosed and claimed herein.

What is claimed is:

1. A wet/dry utility vacuum cleaner assembly comprising a drum base having an interior for receiving vacuum-collected material, a cover for the base, a vacuum motor assembly mounted on the cover, an external port adapted to be coupled with a pickup hose and in communication with the interior of the drum base, the vacuum motor assembly including a universal type electrical motor and a circular vacuum chamber, the electrical motor having an armature and associated metal shaft, the vacuum chamber being disposed axially between the motor and the base, the vacuum chamber including a central inlet facing and communicating with the drum interior and a peripheral outlet, a wall separating the motor and vacuum chamber, a portion of the metal motor shaft extending through the separating wall, a bearing mounted at said separating wall and rotatably supporting said shaft portion, a centrifugal fan mounted on said shaft portion in said vacuum chamber for creating a vacuum in said base interior, electrically insulating means preventing electrical current from being conducted between said shaft portion and fluids in said chamber, and seal means at said wall for preventing passage of fluid from said chamber into said motor, said shaft portion being covered with an electrically insulating sleeve, said fan being formed of sheet metal and being assembled over said sleeve, said metal shaft portion having an integral externally threaded free end extending axially beyond said sleeve, an electrically insulating nut threaded onto said shaft free end and retaining said fan thereon by axial compression of an annular portion of said fan surrounding said sleeve, and annular seal means compressed by said nut preventing contact of fluid with said threaded free end of said shaft.

2. A utility vacuum cleaner assembly as set forth in claim 1, wherein said motor includes a housing formed of electrically insulating material, said motor housing and vacuum chamber being enclosed by a common shroud, fluids discharged from said peripheral outlet being conducted by said shroud over said motor housing to an outlet formed in said shroud.

3. A utility vacuum cleaner assembly as set forth in claim 2, wherein said shroud is formed of electrically insulating material.

4. A vacuum cleaner assembly as set forth in claim 3, wherein said vacuum chamber is formed of sheet metal.

5. A vacuum cleaner assembly as set forth in claim 4, wherein said fan is formed of sheet metal.

6. A wet/dry utility vacuum cleaner assembly comprising a drum base having an interior for receiving vacuum-collected material, a cover for the base, a vacuum motor assembly mounted on the cover, an external port adapted to be coupled with a pickup hose and in communication with the interior of the drum base, the vacuum motor assembly including a universal type electrical motor and a circular fan chamber, the electrical motor having an armature and associated shaft, the fan chamber being disposed axially between the motor and the base, the fan chamber including a central inlet means facing and communicating with the drum interior and peripheral outlet means, a wall separating the motor and fan chamber, a portion of the motor shaft extending through the separating wall, a centrifugal fan mounted on said shaft portion in said fan chamber for creating a vacuum in said base interior by expelling fluids through said peripheral outlet means, electrically insulating means preventing electrical current from being conducted between said shaft portion and fluids in said fan chamber, means on said wall preventing passage of said fluids from said fan chamber into said motor cover, an electrically insulating shroud on said cover and enclosing said motor, said shroud including a section encircling the periphery of said fan chamber and collecting pressurized fluids expelled from said peripheral outlet means for discharging through an outlet, and seal means for preventing pressurized fluids in said shroud section from entering said motor, said motor including a housing having a peripherally continuous radial surface facing in a direction opposite said fan chamber, seal means disposed between said radial surface and said shroud section, and means securing said shroud section to said cover, compression of said seal means by said shroud section developing an axial clamping force on said motor housing for securing said motor housing in position relative to said cover.

7. A utility vacuum cleaner assembly as set forth in claim 6, including an annular gasket disposed between said fan chamber and said cover, the axial spacing of the shroud surfaces respectively associated with said seal means and said cover being determined in relation with the axial length of said fan chamber, the configuration of said motor housing and disposition of said gasket such that both said seal means and gasket are adequately pressed by said shroud section once said shroud section is in contact with said cover.

8. A wet/dry vacuum cleaner unit comprising a tank having an interior for collecting material, an inlet for admitting material to the tank interior, the tank at its upper face including a removable cover, a vacuum motor assembly supported on the cover externally of the tank, the vacuum motor assembly including an electric motor and a circular fan chamber, the fan chamber being disposed axially between the motor and the tank, the fan chamber including a central inlet communicating with the tank interior through an aperture in the cover and peripheral outlet means, a wall separating the motor and fan chamber, the motor including a shaft portion extending through the wall into the fan chamber, a fan supported on said shaft portion in said fan chamber, electrical insulation means preventing electrical current between said fan chamber and said motor along said shaft, seal means in said wall preventing fluids from passing from said chamber into said motor along said shaft, said motor including a bell housing having a generally radial, peripherally continuous surface portion facing away from said tank, said bell housing being formed of electrically insulating material, and a shroud covering said motor bell housing in said fan chamber, said shroud being formed of electrically insulating material, said shroud cooperating with said cover to confine fluids expelled from the outlet means of said fan chamber, said shroud including an outlet for such confined fluids, first compressible annular gasket means disposed axially between said fan chamber and said cover and concentrically about said chamber inlet and cover aperture, second compressible annular gasket means disposed axially between said radial face of said bell housing and said shroud, and means securing said shroud to said cover, said shroud being constructed and arranged when secured to said cover to axially compress both said first gasket against respective portions of said cover and said fan chamber and said second gasket against respective portions of said motor bell housing and said shroud, compressive forces in said first and second gaskets being sufficient to provide the sole means for mounting said vacuum motor and fan chamber to said cover.

* * * * *